US011904617B2

(12) United States Patent
Gotanda et al.

(10) Patent No.: US 11,904,617 B2
(45) Date of Patent: Feb. 20, 2024

(54) COMMODITY-DATA PROCESSING APPARATUS

(71) Applicant: TOSHIBA TEC KABUSHIKI KAISHA, Tokyo (JP)

(72) Inventors: Tsuyoshi Gotanda, Tokyo (JP); Jun Kikuchi, Tagata Shizuoka (JP); Akiko Susaki, Yokohama Kanagawa (JP); Jun Yoshitomi, Tokyo (JP); Shun Hashimoto, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 192 days.

(21) Appl. No.: 17/498,969

(22) Filed: Oct. 12, 2021

(65) Prior Publication Data

US 2022/0024235 A1 Jan. 27, 2022

Related U.S. Application Data

(63) Continuation of application No. 16/280,437, filed on Feb. 20, 2019, now Pat. No. 11,142,010.

(30) Foreign Application Priority Data

Feb. 23, 2018 (JP) ................................ 2018-030602

(51) Int. Cl.
*B41J 29/13* (2006.01)
*B41J 29/38* (2006.01)
(Continued)

(52) U.S. Cl.
CPC ............... *B41J 29/38* (2013.01); *B41J 29/13* (2013.01); *G07G 1/0018* (2013.01); *G07G 1/0027* (2013.01); *G07G 5/00* (2013.01)

(58) Field of Classification Search
CPC .......... G07G 5/00; G07G 1/0018; B41J 29/13
See application file for complete search history.

(56) References Cited

U.S. PATENT DOCUMENTS 6,042,007 A 3/2000 Nugent, Jr. et al.
6,065,679 A 5/2000 Levie et al.
(Continued)

FOREIGN PATENT DOCUMENTS

CN 101905578 A 12/2010
CN 206287667 U 6/2017
(Continued)

OTHER PUBLICATIONS

Japanese Notice of Reasons for Refusal dated Aug. 31, 2021 in corresponding Japanese Patent Application No. 2018-030602, 6 pages (with Translation).
(Continued)

*Primary Examiner* — Lam S Nguyen
(74) *Attorney, Agent, or Firm* — Kim & Stewart LLP

(57) ABSTRACT

A commodity-data processing apparatus includes a housing, a printer unit mounted in the housing and movable between a housed position at which the printer unit fits in a printer housing space and a drawn-out position, and a controller. The printer unit includes a cover that is movable between a closed position and an open position when the printer unit is at the drawn-out position and not movable between the closed position and the open position when the printer unit is at the housed position. The controller is configured to determine whether the cover is moved from the open position to the closed position, determine whether or not the printer unit is ready for printing, upon determining that the cover is moved from the open position to the closed position, and enable receipt printing by the printing unit, upon determining that the printer unit is ready for printing.

20 Claims, 8 Drawing Sheets

(51) Int. Cl.
*G07G 5/00* (2006.01)
*G07G 1/00* (2006.01)

(56) References Cited

U.S. PATENT DOCUMENTS

| | | | | |
|---|---|---|---|---|
| 7,165,904 | B2 | 1/2007 | Furihata et al. | |
| 10,026,252 | B2 * | 7/2018 | Shimura | G07G 3/003 |
| 2008/0123126 | A1 | 5/2008 | Harris | |
| 2008/0182639 | A1 | 7/2008 | Antonopoulos et al. | |
| 2011/0130873 | A1 * | 6/2011 | Yepez | G07F 9/10 221/92 |
| 2013/0119131 | A1 | 5/2013 | Cong et al. | |
| 2016/0133103 | A1 | 5/2016 | Kanomata | |
| 2016/0253646 | A1 | 9/2016 | Shinmura et al. | |
| 2017/0017263 | A1 * | 1/2017 | Birgeoglu | G07G 1/0018 |

FOREIGN PATENT DOCUMENTS

| | | | |
|---|---|---|---|
| EP | 1468835 | A1 | 10/2004 |
| EP | 3062296 | A1 | 8/2016 |
| JP | 2002-160411 | A | 6/2002 |
| JP | 2003-091776 | A | 3/2003 |
| JP | 2009-276973 | A | 11/2009 |
| JP | 2010-105227 | A | 5/2010 |
| JP | 2013-107258 | A | 6/2013 |
| JP | 2014-038649 | A | 2/2014 |

OTHER PUBLICATIONS

Extended European Search Report dated Jul. 9, 2019, filed in counterpart European Patent Application No. 19158619.7, 7 pages.
Chinese First Office Action dated Jan. 22, 2021, mailed in counterpart Chinese Patent Application No. 201910081420.X, 24 pages (with Translation).
European Communication from the Examining Division dated Feb. 23, 2021, mailed in European Patent Application No. 19158619.7, 6 pages.

* cited by examiner

COMMODITY-DATA PROCESSING APPARATUS

CROSS-REFERENCE TO RELATED APPLICATIONS

This application is a continuation of U.S. patent application Ser. No. 16/280,437, filed on Feb. 20, 2019, which based upon and claims the benefit of priority from Japanese Patent Application No. 2018-030602, filed on Feb. 23, 2018, the entire contents of each of which are incorporated herein by reference.

FIELD

Embodiments described herein relate generally to, for example, a commodity-data processing apparatus including a printer that issues a receipt.

BACKGROUND

A point-of-sale (POS) terminal including a scanner that reads code information of a commodity and a printer that issues a receipt is known. In order to hold the code information of the commodity over the scanner, a relatively large work space for a user to handle the commodity is necessary on the near side of the scanner. Therefore, in the POS terminal, the scanner may be disposed above the printer. A space in the front of the printer can be used as the work space.

On the other hand, if a receipt roll of the printer is used up or if a jam occurs in the printer, the printer may need to be drawn out from a housing of the POS terminal to the work space in the front to replace the receipt roll or clear the jam.

The replacement of the receipt roll or the jam clearing work is often performed in a state in which a customer who purchases commodities is kept waiting. It is desirable to end the work and print a receipt as quickly as possible.

However, if the printer is drawn out to the work space, the printer may become capable of issuing a receipt only after the printer is returned to the original position. For example, if the jam is not cleared when the printer is returned to the original position, it is necessary to draw out the printer and perform the jam clearing work again.

Accordingly, it is desirable to provide a commodity-data processing apparatus that can quickly issue a receipt after an end of replacement of a receipt roll or jam clearing work.

DETAILED DESCRIPTION

According to an embodiment, a commodity-data processing apparatus includes a housing having a printer housing space, a printer unit mounted in the housing and movable between a housed position at which the printer unit fits in the printer housing space and a drawn-out position at which the printer unit is drawn out of the printer housing space. The printer unit includes a cover that is movable between a closed position and an open position when the printer unit is at the drawn-out position and not movable between the closed position and the open position when the printer unit is at the housed position. The commodity-data processing apparatus also includes a cover sensor configured to detect a position of the cover of the printer unit, and a controller. The controller configured to determine whether the cover is moved from the open position to the closed position based on the detected position of the cover sensor, determine whether or not the printer unit is ready for printing, upon determining that the cover is moved from the open position to the closed position, and enable receipt printing by the printing unit, upon determining that the printer unit is ready for printing.

An embodiment is explained in detail below with reference to the drawings.

Figure 1:
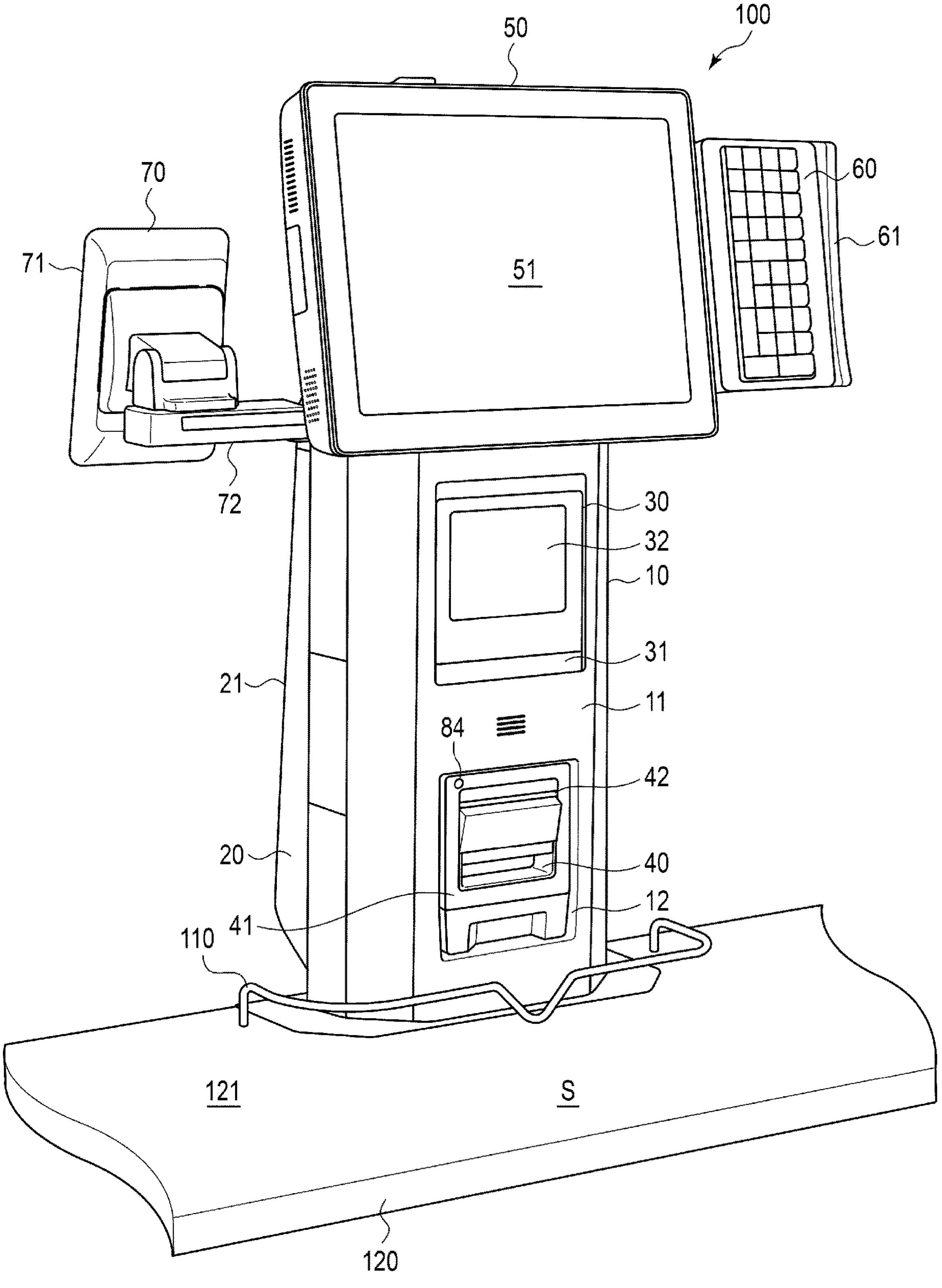
FIG. 1 illustrates an exterior perspective view of a commodity-data processing apparatus according to an embodiment.

As illustrated in FIG. 1, a commodity-data processing apparatus 100 (hereinafter simply referred to as apparatus 100) according to the embodiment includes a housing 10 including a front surface 11 that a store clerk of a store selling commodities faces. A back cover 20 is detachably attached to the back side of the housing 10. The back cover 20 includes an inclined back surface 21 facing a space where a customer purchasing commodities passes. The back surface 21 functions as a display surface that displays various kinds of information for the customer.

On the front surface 11 side of the housing 10, it is necessary to secure a relatively wide work space S for the store clerk to handle reading target commodities. In order to secure the work space S as wide as possible, the front surface 11 of the housing 10 is formed as a flat plane (without protrusions) extending along the vertical direction. If the front surface 11 of the housing 10 is formed as a flat perpendicular surface, a commodity may not hit against protrusions when a barcode of the commodity is held over a reading window 32 of a scanner unit 30. Therefore, workability can be improved.

A protection guide 110 for preventing a basket including commodities from colliding with the housing 10 of the apparatus 100 is attached between the work space S and the housing 10. The protection guide 110 is provided to project upward from an upper surface 121 of a table 120 on which the basket is placed. The shape of the protection guide 110 is not limited to a shape illustrated in FIG. 1 and may be any shape. The protection guide 110 is not an indispensable component.

In the housing 10, the scanner unit 30 and a printer unit 40 are vertically provided side by side. In the present embodiment, the printer unit 40 is disposed under the scanner unit 30 and housed and disposed in the housing 10. Therefore, the housing 10 of the apparatus 100 has a relatively vertically long structure.

The scanner unit 30 includes a front surface 31 that can be flush with the front surface 11 of the housing 10. The reading window 32 for reading a barcode of a commodity is provided on the front surface 31 of the scanner unit 30. The reading window 32 can be positioned to be substantially parallel to the front surface 11 of the housing 10 and positioned to be inclined downward with respect to the front surface 11 of the housing 10. That is, the scanner unit 30 includes a not-illustrated tilt mechanism that inclines the reading window 32 at any angle.

Figure 2:
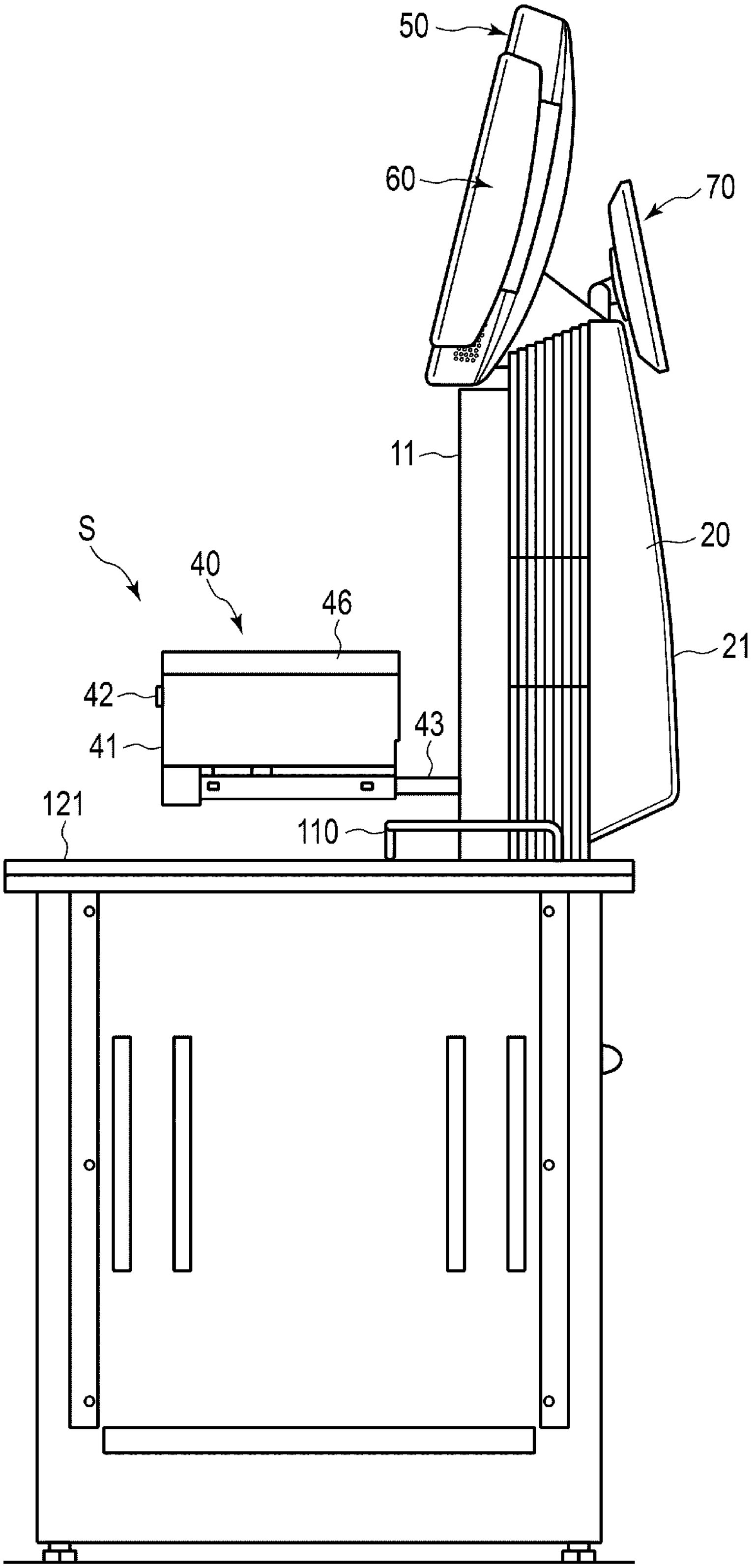
FIG. 2 illustrates a side view of the commodity-data processing apparatus in a state in which a printer unit is drawn out from a housing.
Figure 3:
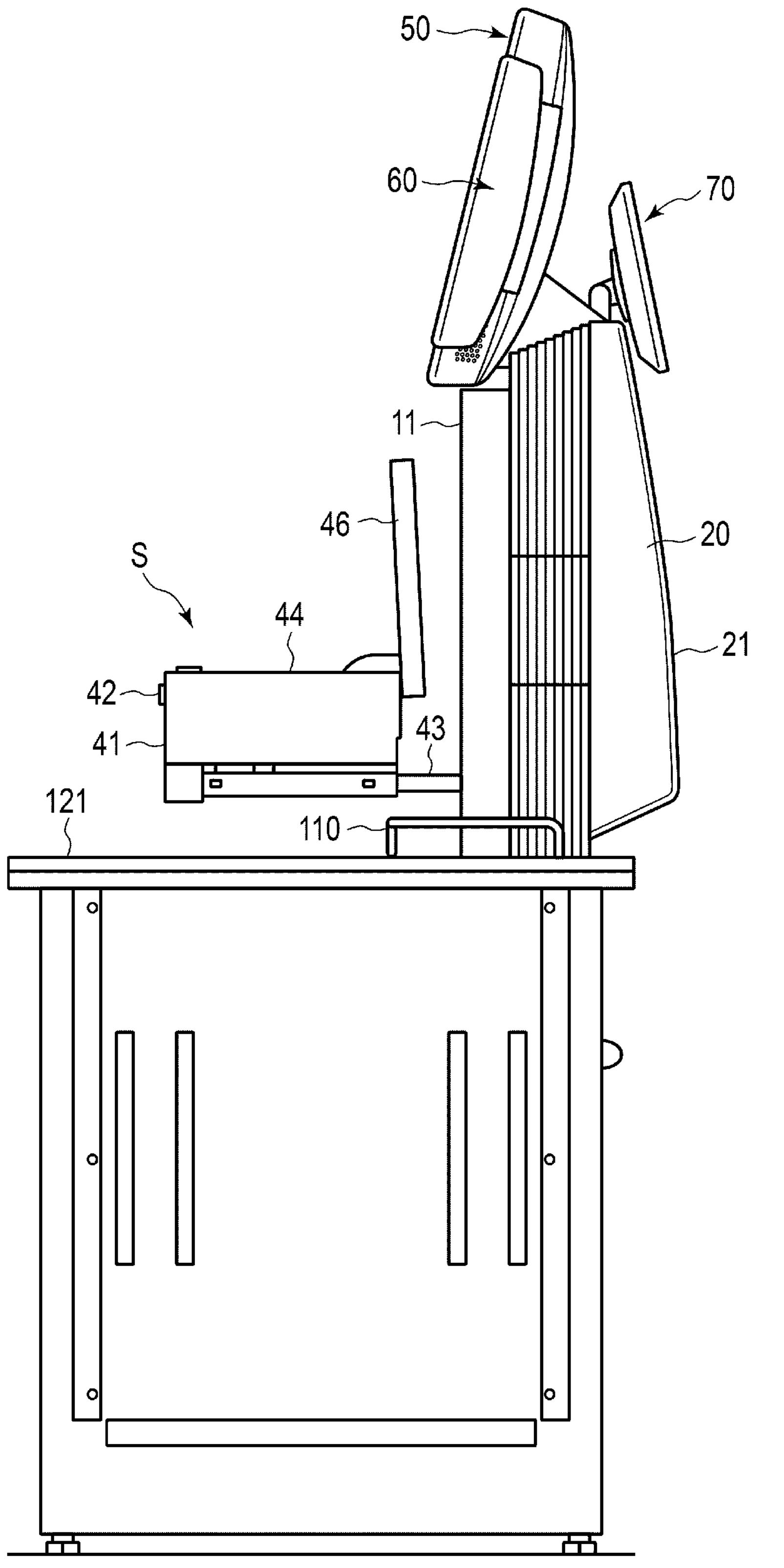
FIG. 3 illustrates a side view of the commodity-data processing apparatus in a state in which a cover of the printer unit is open.

The printer unit 40 is insertable into and removable from a housing section 12 provided in a lower part of the housing 10. That is, the housing section 12 having a rectangular box shape for insertably and removably housing the printer unit 40 is provided below the scanner unit 30. The front surface side of the housing section 12 is open to the front surface 11 of the housing 10. As illustrated in FIGS. 2 and 3, two rails 43 (only one of the rails 43 is illustrated in FIGS. 2 and 3) that support the bottom surface of the printer unit 40 are provided at the bottom of the housing section 12.

As illustrated in FIGS. 2 and 3, the two rails 43 are capable of being drawn out from the housing section 12 toward the work space S in the front of the housing 10. In an illustrated state in which the two rails 43 are drawn out from the housing 10, the two rails 43 support the printer unit 40 in a position where the printer unit 40 is drawn out further to the near side (the work space S side) than the front surface 11 of the housing 10. When the printer unit 40 is pushed into the housing section 12, the two rails 43 shrink while supporting the bottom surface of the printer unit 40 and are housed in the housing section 12 together with the printer unit 40.

A not-illustrated receipt roll is housed and disposed in the printer unit 40. The receipt roll is obtained by, for example, rolling elongated receipt paper having width of approximately several ten millimeters and length of several ten meters. A discharge port 42 for discharging a receipt cut off from the receipt roll is provided on a front surface 41 of the printer unit 40.

An opening section 44 for accessing the inside of the printer unit 40 to perform replacement of the receipt roll and jam treatment is provided in an upper part of the printer unit 40. A cover 46 for opening and closing the opening section 44 is provided in the opening section 44. FIG. 3 illustrates a state in which the printer unit 40 is drawn out from the housing section 12 of the housing 10 and the cover 46 is open.

The housing section 12 that houses the printer unit 40 is provided in a position separated upward from the lower end of the housing 10. When the receipt roll is fed to the printer unit 40, the printer unit 40 can be drawn out forward from the housing section 12. That is, since the protection guide 110 is provided on the front surface 11 side of the housing 10, the housing section 12 is provided in a position higher than the height of the protection guide 110 projecting upward from the upper surface of the table 120 to prevent the printer unit 40 drawn out from the housing section 12 from interfering with the protection guide 110.

As the receipt roll, a receipt roll having a relatively large diameter is used in order to reduce the number of times of replacement. Therefore, the printer unit 40 including the receipt discharge port 42 on the front surface 41 has a predetermined size in the radial direction of the receipt roll, that is, the up-down direction and the front-back direction of the printer unit 40. Therefore, in the present embodiment, the printer unit 40 is disposed in a lower part of the housing 10 and the back side of the printer unit 40 is projected toward the inner surface of the back cover 20.

That is, in the present embodiment, the printer unit 40 larger than the scanner unit 30 in a dimension in the front-back direction is disposed in the lower part of the housing 10. The scanner 30 is disposed above the printer unit 40. Further, the front surface 31 of the scanner unit 30 and the front surface 41 of the printer unit 40 are substantially flush with the front surface 11 of the housing 10. Therefore, the back cover 20 covering the back side of the housing 10 is formed in a wedge shape inclined to the back side downward as illustrated in FIGS. 2 and 3.

In this way, the relatively large printer unit 40 is disposed in the lower part and the relatively small scanner unit 30 is disposed in the upper part. Therefore, the housing 10 can be stably set.

As illustrated in FIG. 1, the apparatus 100 includes an operation panel 50 including a not-illustrated control board mounted with a processor. The control board of the operation panel 50 functions as a control section that controls the apparatus 100. Besides, the apparatus 100 includes, as optional components, a keyboard 60 attached to a side surface of the operation panel 50 and a sub-panel 70.

The operation panel 50 includes an operation screen 51 on the front side (the store clerk side). The operation panel 50 is turnably attached to the upper end of the housing 10. That is, the operation panel 50 is attached to the upper end of the housing 10 in a state in which the direction of the operation screen 51 can be changed. The operation panel 50 is disposed above the scanner unit 30. The operation panel 50 includes a touch sensor on the operation screen 51 capable of displaying an image. The store clerk is capable of performing various kinds of input operations by touching, with a finger, various buttons displayed on the operation screen 51.

The keyboard 60 includes a card reader 61. The keyboard 60 includes a multiplication key and a subtotal key. The card reader 61 reads data recorded in a credit card and a point card. In FIG. 1, a card reader capable of reading a magnetic card is provided. However, the card reader 61 may be a card reader capable of reading a contact-type IC card and a non-contact type IC card.

The sub-panel 70 is attached to project to a side of the housing 10 via an arm 72. The arm 72 turnably supports the sub-panel 70 in an illustrated state in which an operation surface 71 of the sub-panel 70 is directed to the customer or a state in which the operation surface 71 is directed to the store clerk. The sub-panel 70 is usable as a terminal operated by the customer and usable as an auxiliary terminal operated by the store clerk.

Figure 4:
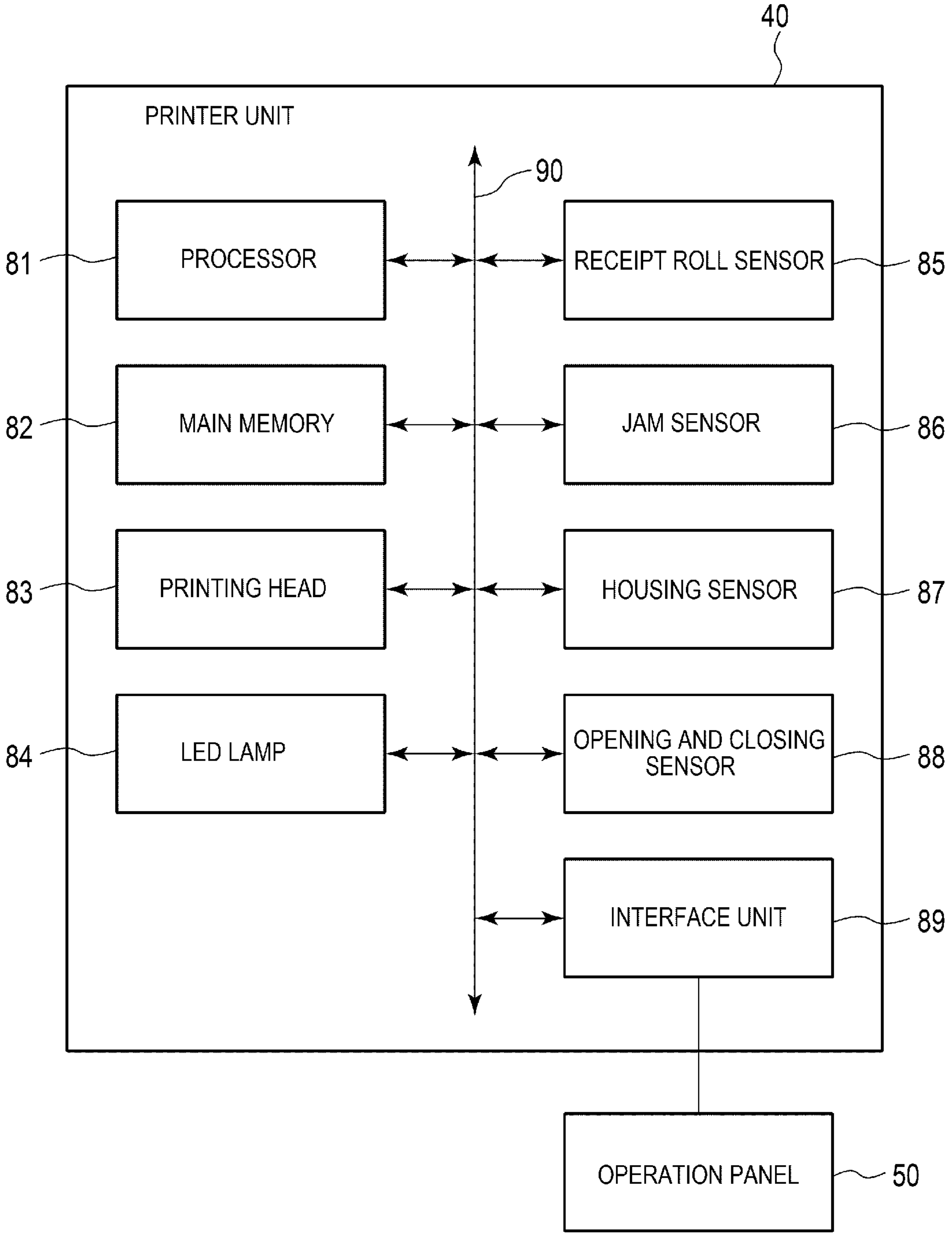
FIG. 4 is a block diagram illustrating a control system of the printer unit of the commodity-data processing apparatus illustrated in FIG. 1.

FIG. 4 is a block diagram illustrating a main circuit configuration of the printer unit 40. The printer unit 40 is connected to the operation panel 50. The printer unit 40 issues a receipt in response to a print request from the operation panel 50.

The printer unit 40 includes a processor 81, a main memory 82, a printing head 83, an LED lamp 84, a receipt roll sensor 85, a jam sensor 86, a housing sensor 87, an opening and closing sensor 88, an interface unit 89, and a transmission line 90. The processor 81, the main memory 82, the printing head 83, the LED lamp 84, the receipt roll sensor 85, the jam sensor 86, the housing sensor 87, the opening and closing sensor 88, and the interface unit 89 are connected via the transmission line 90.

In the printer unit 40, a computer that performs information processing for controlling the printer unit 40 is configured by connecting the processor 81 and the main memory 82 via the transmission line 90. The printer unit 40 may further include an auxiliary storage unit connected to the transmission line 90. The computer including the auxiliary storage unit as an auxiliary storage portion may be configured. As the auxiliary storage unit, for example, an EEPROM® (electric erasable programmable read-only memory) is used. As the auxiliary storage unit, an HDD (hard disc drive), an SSD (solid state drive), or the like can also be applied.

The processor 81 is equivalent to a central portion of the computer. The processor 81 controls the sections to perform various functions of the printer unit 40 according to an operating system, firmware, and application programs.

The main memory 82 is equivalent to a main storage portion of the computer. The main memory 82 includes a nonvolatile memory region and a volatile memory region. The main memory 82 stores the operating system, the firmware, and the application programs in the nonvolatile memory region. The main memory 82 may store data necessary for the processor 81 to execute processing for controlling the sections in the nonvolatile or volatile memory region. The main memory 82 uses the volatile memory region as a work area in which data is rewritten as appropriate by the processor 81.

The printing head 83 prints any image and characters on a receipt roll under an instruction by the processor 81. The printing head 83 is, for example, a well-known thermal head. The printing head 83 is attached to the inner side of the cover 46 provided in an upper part of the printer unit 40. That is, the printing head 83 is capable of being drawn out from the housing section 12 together with the printer unit 40. Therefore, even in a state in which the printer unit 40 is drawn out from the housing section 12, printing on receipt paper can be performed if the cover 46 is closed.

The LED lamp 84 functions as an informing section for informing a state of the printer unit 40 to an operator. The LED lamp 84 is provided on the front surface 41 of the printer unit 40. If the printer unit 40 is in a printable state, the LED lamp 84 is controlled to be lit in green. If the printer unit 40 is in a printing prohibited state, the LED lamp 84 is controlled to be lit in red.

The receipt roll sensor 85 detects that a receipt roll is normally mounted in the printer unit 40. The jam sensor 86 detects a jam of receipt paper in the printer unit 40. The receipt roll sensor 85 and the jam sensor 86 function as abnormality sensors that detect abnormality of the printer unit 40.

The housing sensor 87 detects a housing state of the printer unit 40 in the housing 10. That is, the housing sensor 87 detects that the printer unit 40 is normally mounted in the housing section 12 of the apparatus 100. Specifically, the housing sensor 87 detects that the printer unit 40 is mounted in the housing section 12 and detects that the printer unit 40 in a state illustrated in FIGS. 2 and 3 in which the printer unit 40 is drawn out from the housing 10 of the apparatus 100.

The opening and closing sensor 88 detects an opening and closing state of the cover 46 of the printer unit 40. Specifically, the opening and closing sensor 88 detects that the cover 46 is disposed in a closing position for closing the opening section 44 of the printer unit 40 and detects that the cover 46 is disposed in an opening position illustrated in FIG. 3 for fully opening the opening section 44.

The cover 46 can be opened as illustrated in FIG. 3 in a state in which the printer unit 40 is drawn out to a position illustrated in FIG. 2. In other words, the cover 46 cannot be opened in a state in which the printer unit 40 is housed in the housing section 12 of the housing 10 of the apparatus 100.

The operation panel 50 is connected to the interface unit 89 via, for example, a communication cable. The interface unit 89 performs transmission and reception of various data between the interface unit 89 and the operation panel 50. As the interface unit 89, a ready-made device conforming to a well-known standard such as a USB (universal serial bus) can be used.

The transmission line 90 includes an address bus, a data bus, and a control signal line and transmits data and control signals exchanged among the connected sections.

Figure 5:
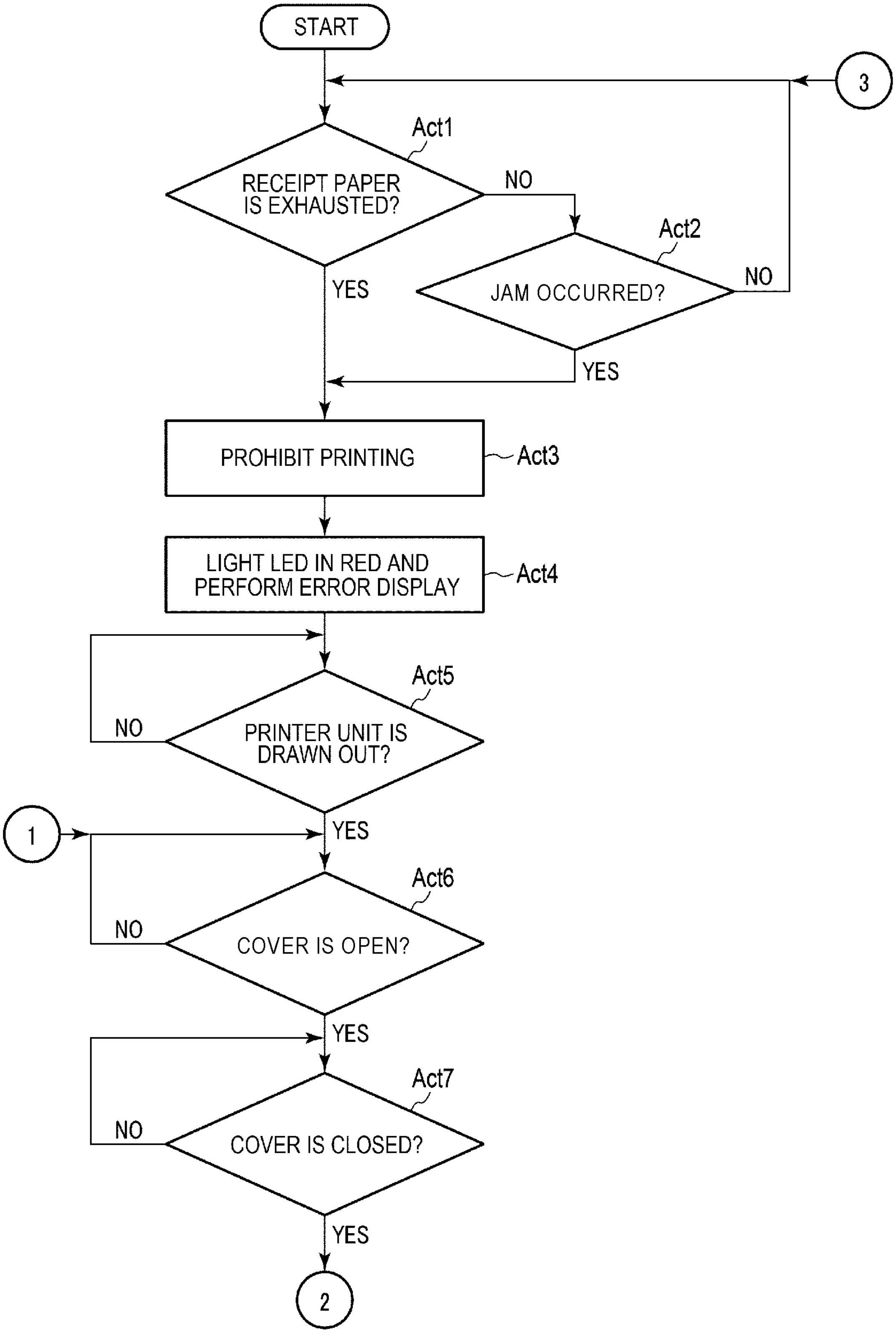
FIGS. 5 and 6 are flowcharts of operations carried out by the printer unit according to a first operation example.

A first operation example of the printer unit 40 explained above is described below with reference to FIG. 5.

If the printer unit 40 is set in an operation state in which the printer unit 40 is capable of issuing a receipt in response to a request from the operation panel 50, the processor 81 executes information processing explained below according to the firmware or the application programs stored in the main memory 82.

In Act 1, the processor 81 determines whether receipt paper is exhausted. A sensor that detects the receipt paper is provided in a route for conveying the receipt paper. It is determined according to an output of the sensor whether the receipt paper is exhausted. Alternatively, a residual amount of receipt paper of a receipt roll housed and disposed in the printer unit 40 may be confirmed and compared with a preset threshold to determine whether the receipt paper is exhausted. In this case, the remaining amount of the receipt paper can be calculated by, for example, after the receipt roll is replaced with a new receipt roll, counting the number of issued receipts by the apparatus 100 and multiplying together a preset average length of receipts and the number of issued receipts. If determining in Act 1 that the receipt paper is exhausted (YES in Act 1), the process proceeds to Act 3.

If determining in Act 1 that the receipt paper is not exhausted (NO in Act 1), in Act 2, the processor 81 detects presence or absence of a jam via the jam sensor 86 and determines whether or not a jam of the receipt paper occurred in the printer unit 40. If determining in Act 2 that a jam occurred (YES in Act 2), the process proceeds to Act 3. On the other hand, if determining in Act 2 that a jam has not occurred (NO in Act 2), the process returns to Act 1.

In Act 3, first, the processor 81 prohibits printing on the receipt paper by the printer unit 40. Subsequently, in Act 4, the processor 81 lights the LED lamp 84 in red and transmits a signal for performing error display to the operation panel 50 via the operation screen 51. At this time, the error display has content for informing the receipt roll exhaustion or the jam occurrence to the operator.

In Act 5, the processor 81 determines whether the printer unit 40 is drawn out from the housing section 12 of the housing 10 in order to perform replacement of the receipt roll or jam treatment. At this time, the processor 81 detects via the housing sensor 87 whether or not the printer unit 40 is in a state in which the printer unit 40 is drawn out to a drawn-out position illustrated in FIG. 2. If determining in Act 5 that the printer unit 40 is in the drawn-out state (YES in Act 5), the process proceeds to Act 6.

In Act 6, the processor 81 determines via the opening and closing sensor 88 whether or not the cover 46 of the printer unit 40 is open as in the state illustrated in FIG. 3. After determining in Act 6 that the cover 46 is in the open state (YES in Act 6), in Act 7, the processor 81 determines via the opening and closing sensor 88 whether or not the cover 46 of the printer unit 40 is closed. Until the processor 81 determines in Act 7 that the cover 46 is closed (NO in Act 7), that is, in the state in which the cover 46 is open, the operator carries out replacement work of the receipt roll or jam treatment work.

If determining in Act 7 that the cover 46 is closed (YES in Act 7), in Act 8, the processor 81 determines via the receipt roll sensor 85 whether or not the receipt roll is normally mounted in a predetermined position in the printer unit 40. If determining in Act 7 whether the cover 46 is closed (YES in Act 7), in Act 9, the processor 81 determines via the jam sensor 86 that there is no jam of the receipt paper in the printer unit 40.

If determining in Act 8 that the receipt roll is normally mounted and determining in Act 9 that there is no jam (YES in Act 8 and YES in Act 9), in Act 10, the processor 81 releases the printing prohibition set in Act 3 to permit printing on the receipt roll and the process proceeds to Act 11.

In Act 11, the processor 81 lights the LED lamp 84 in green and transmits a signal for ending the error display displayed via the operation screen 51 to the operation panel 50. Consequently, the LED lamp 84 is lit in green.

In this state, the printer unit 40 is kept drawn out to the position illustrated in FIG. 2. However, the printer unit 40 is capable of performing printing on the receipt roll and issuing a receipt. That is, according to the first operation example, in a state in which the printer unit 40 is capable of issuing a receipt and in a state in which the cover 46 is closed, it is possible to issue a receipt while keeping the printer unit 40 drawn out. It is possible to quickly issue a receipt to a customer.

According to the first operation example, even in a state in which the printer unit 40 is drawn out, as long as the cover 46 is closed and there is no abnormality in the printer unit 40, the LED lamp 84 for informing that issuance of a receipt is possible is lit in green. Therefore, the operator can determine that the printer unit 40 is normally operable before housing the printer unit 40 in the housing section 12 and can learn, in an early stage, an end of the replacement work of the receipt roll or the jam treatment work. Consequently, it is unnecessary to confirm operation after pushing the printer unit 40 into the housing section 12. It is possible to quickly issue a receipt to a customer.

Figure 6:
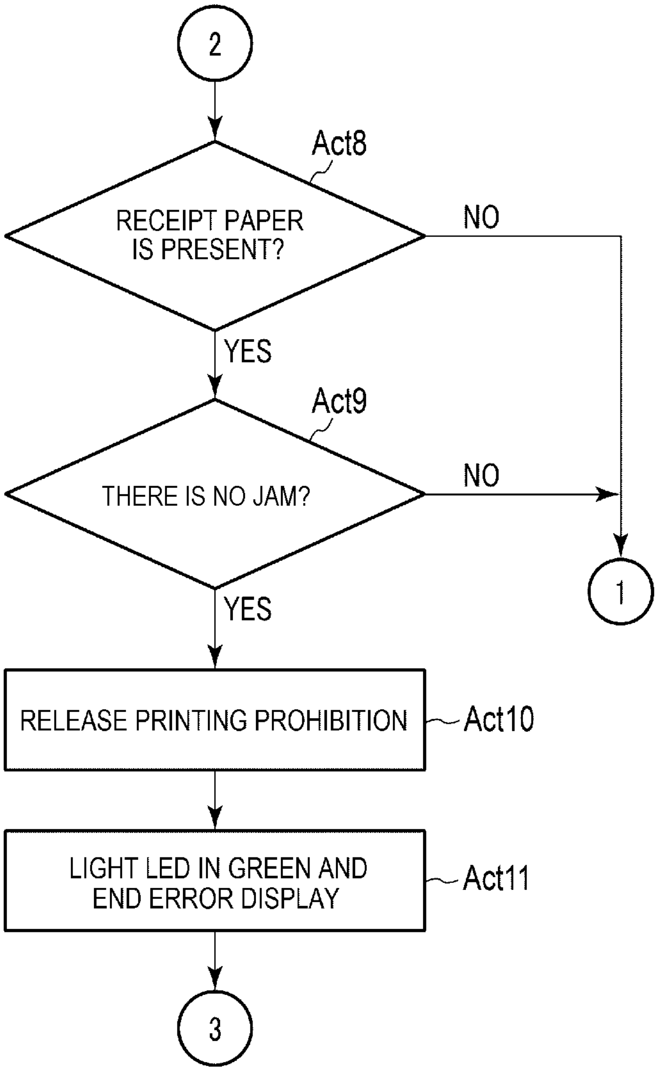
Figure 7:
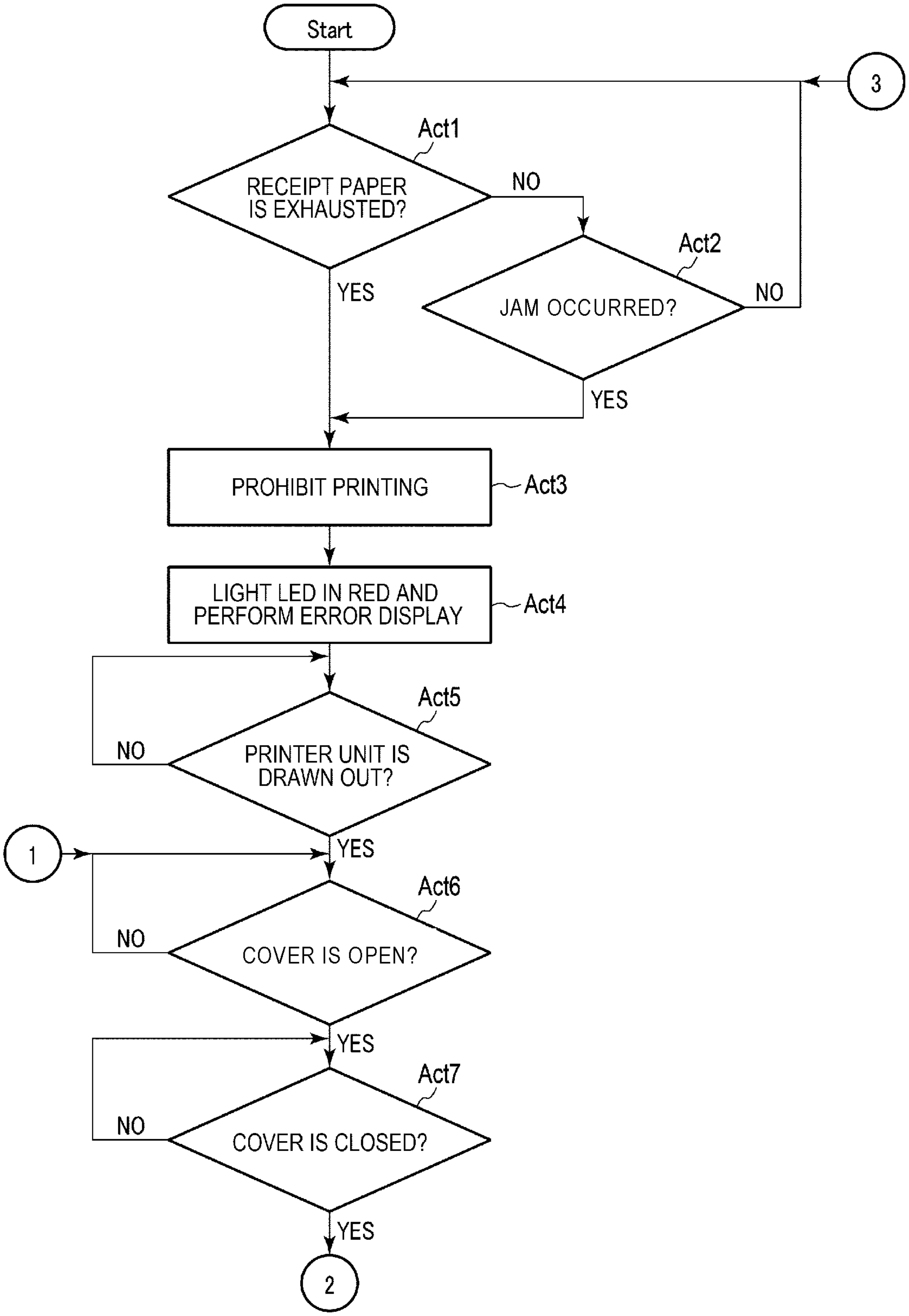
FIGS. 7 and 8 are flowcharts of operation carried out by the printer unit according to a second operation example.
Figure 8:
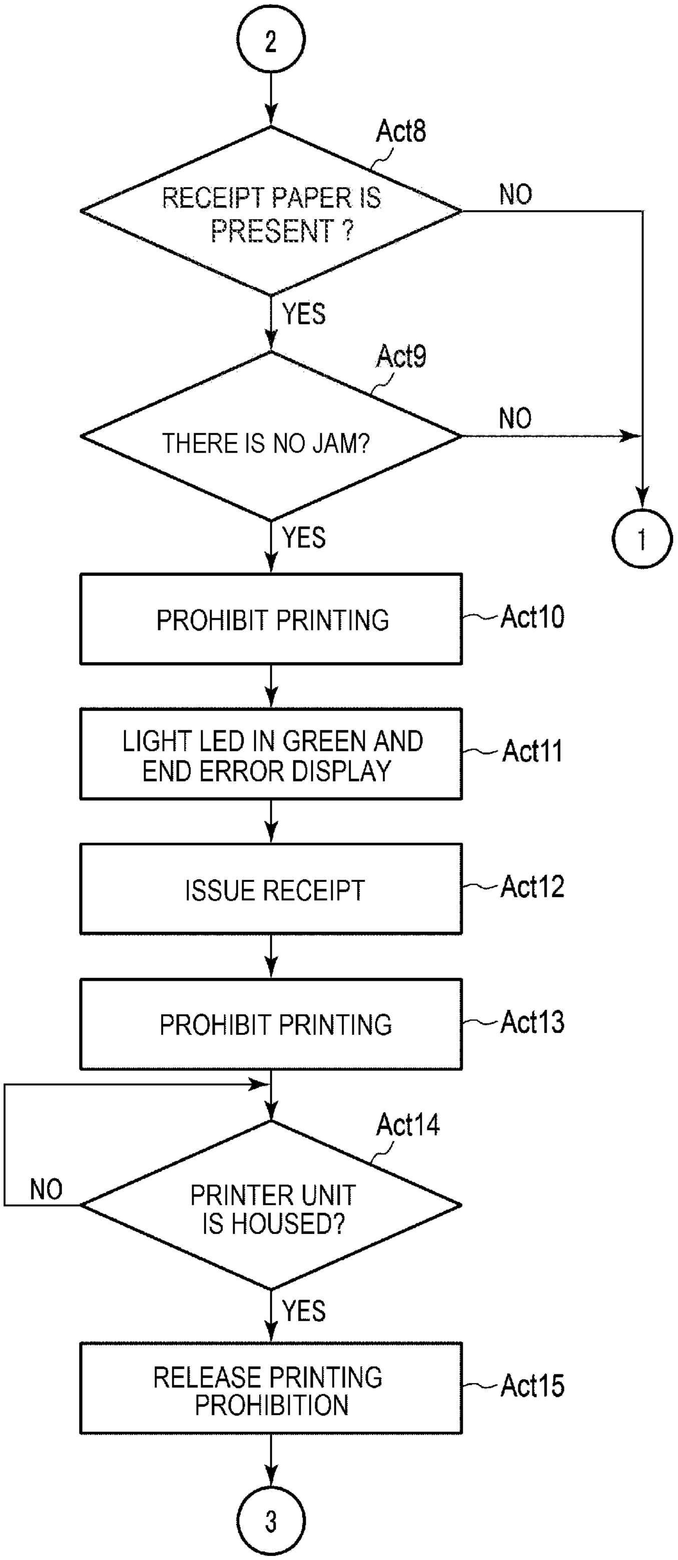

A second operation example of the printer unit 40 is explained with reference to FIG. 6. Since Act 1 to Act 11 are substantially the same as Act 1 to Act 11 in the first operation example, most of explanation of Act 1 to Act 11 is omitted.

In the second operation example, after determining in Act 8 that a receipt roll is present and determining in Act 9 that there is no jam, in Act 10, the processor 81 releases the printing prohibition set in Act 3 to permit issuance of only one receipt. At this time, the processor 81 permits issuance of only one receipt based on code information of a commodity scanned immediately before the printing is prohibited in Act 3. The process proceeds to Act 11.

In Act 11, the processor 81 lights the LED lamp 84 in green, transmits a signal for ending the error display displayed via the operation screen 51 to the operation panel 50, and the process proceeds to Act 12. In Act 12, the processor 81 issues only one receipt and then the process proceeds to Act 13.

Thereafter, in Act 13, the processor 81 prohibits printing on the receipt paper by the printer unit 40 and the process proceeds to Act 14. In Act 14, the processor 81 determines via the housing sensor 87 whether or not the printer unit 40 is housed in the housing section 12. If the printer unit 40 is housed in the housing section 12 (YES in Act 14), the process proceeds to Act 15.

Finally, in Act 15, the processor 81 releases the printing prohibited state set in Act 13 and the process returns to Act 1.

As explained above, according to the second operation example, the issuance of only one receipt is permitted in the state in which the printer unit 40 is kept drawn out. Therefore, it is possible to quickly issue a receipt to a customer who is waiting for an end of the replacement work of the receipt roll or the jam treatment work.

According to the second operation example, the printing by the printer unit 40 is prohibited until the printer unit 40 is housed in the housing section 12 after a receipt is issued only once. Therefore, it is possible to prevent processing from being continued in the state in which the printer unit 40 is kept drawn out.

With the commodity-data processing apparatus in the embodiment explained above, it is possible to issue a receipt in the state in which the printer unit 40 is kept drawn out from the housing 10 after the replacement work of the receipt roll or the jam treatment work in the printer unit 40. Therefore, it is possible to quickly issue a receipt after an end of the replacement of the receipt roll or the jam treatment work. It is possible to improve usability.

The embodiment explained above is presented as an example and is not intended to limit the scope of the invention. The embodiment can be implemented in other various forms. Various omissions, substitutions, and changes can be performed without departing from the spirit of the invention. The embodiment and modifications of the embodiment are included in the scope and the gist of the invention and included in the inventions described in claims and the scope of equivalents of the inventions.

For example, in the embodiment explained above, the LED lamp 84 is used as the informing section for informing the operator that issuance of a receipt is permitted. However, not only this, but a speaker that generates speech guidance may be used as the informing section.

What is claimed is:

1. A commodity-data processing apparatus comprising:

a housing having a printer housing space;

a printer unit mounted in the housing and movable between a housed position at which the printer unit fits in the printer housing space and a drawn-out position at which the printer unit is drawn out of the printer housing space, the printer unit including a cover that is movable between a closed position and an open position when the printer unit is at the drawn-out position and not movable between the closed position and the open position when the printer unit is at the housed position;

a cover sensor configured to detect a position of the cover of the printer unit and a controller configured to:

determine whether the cover is moved from the open position to the closed position based on the detected position of the cover sensor, determine whether or not the printer unit is ready for printing, upon determining that the cover is moved from the open position to the closed position, and generate a signal that causes a notification that the printing unit is ready for printing in a state in which the printer unit is at the drawn-out position, upon determining that the printer unit is ready for printing.

2. The commodity-data processing apparatus according to claim 1, further comprising:

a printer sensor configured to detect a position of the printer unit, wherein the controller is further configured to determine whether the printer unit is moved from the housed position to the drawn-out position based on the detected position of the printer sensor.

3. The commodity-data processing apparatus according to claim 2, wherein the controller is further configured to determine whether the cover is moved from the open position to the closed position upon determining that the printer unit is moved from the housed position to the drawn-out position.

4. The commodity-data processing apparatus according to claim 1, wherein the controller is further configured to enable receipt printing by the printing unit, upon determining that the printer unit is ready for printing.

5. The commodity-data processing apparatus according to claim 4, wherein the controller enables the receipt printing in the state in which the printer unit is at the drawn-out position.

6. The commodity-data processing apparatus according to claim 4, wherein the controller enables the receipt printing of a limited number by the printing unit, upon determining that the printer unit is ready for printing.

7. The commodity-data processing apparatus according to claim 6, wherein the controller is further configured to disable receipt printing by the printing unit, after the printer unit prints receipts of the limited number.

8. The commodity-data processing apparatus according to claim 6, wherein the limited number is one.

9. The commodity-data processing apparatus according to claim 1, further comprising:

a display, wherein the signal causes the display to display the notification.

10. The commodity-data processing apparatus according to claim 9, wherein the indicator is disposed on the printer unit.

11. The commodity-data processing apparatus according to claim 1, wherein the controller determines whether or not the printer unit is ready for printing based on at least one of a sheet availability and a sheet jam.

12. The commodity-data processing apparatus according to claim 1, further comprising:

an anomaly sensor configured to detect an anomaly of the printer unit, wherein the controller is configured to determine whether or not the printer unit is ready for printing based on a detection result of the anomaly sensor.

13. The commodity-data processing apparatus according to claim 1, further comprising an indicator, wherein the controller is further configured to control the indicator to indicate that the printing unit is ready for printing, upon determining that the printer unit is ready for printing.

14. The commodity-data processing apparatus according to claim 1, wherein the printer unit includes a printer head that is attached to the cover and movable as the cover moves.

15. The commodity-data processing apparatus according to claim 1, wherein the cover is positioned at a top portion of the printer unit.

16. The commodity-data processing apparatus according to claim 1, wherein the controller is further configured to generate a second signal that causes an error notification to be terminated upon determining that the printer unit is ready for printing.

17. A commodity-data processing apparatus comprising:

a housing having a printer housing space;

a printer unit mounted in the housing and movable between a housed position at which the printer unit fits in the printer housing space and a drawn-out position at which the printer unit is drawn out of the printer housing space, the printer unit including a cover that is movable between a closed position and an open position when the printer unit is at the drawn-out position and not movable between the closed position and the open position when the printer unit is at the housed position;

a printer sensor configured to detect a position of the printer unit;

a cover sensor configured to detect a position of the cover of the printer unit;

an anomaly sensor configured to detect an anomaly of the printer unit; and a controller configured to:

determine whether the printer unit is moved from the housed position to the drawn-out position based on the detected position of the printer sensor, determine whether the cover is moved from the open position to the closed position based on the detected position of the cover sensor, when determining that the printer unit is moved from the housed position to the drawn-out position, determine whether or not there is an anomaly in the printer unit based on a detection result of the anomaly sensor, upon determining that the cover is moved from the open position to the closed position, and generate a signal that causes a notification that the printing unit is ready for printing in a state in which the printer unit is at the drawn-out position, upon determining that there is no anomaly in the printer unit.

18. The commodity-data processing apparatus according to claim 17, wherein the controller is further configured to enable receipt printing by the printing unit, upon determining that there is no anomaly in the printer unit.

19. The commodity-data processing apparatus according to claim 18, wherein the controller enables the receipt printing in the state in which the printer unit is at the drawn-out position.

20. The commodity-data processing apparatus according to claim 18, wherein the controller enables the receipt printing of a limited number by the printing unit, upon determining that there is no anomaly in the printer unit.

* * * * *